Figure 1:
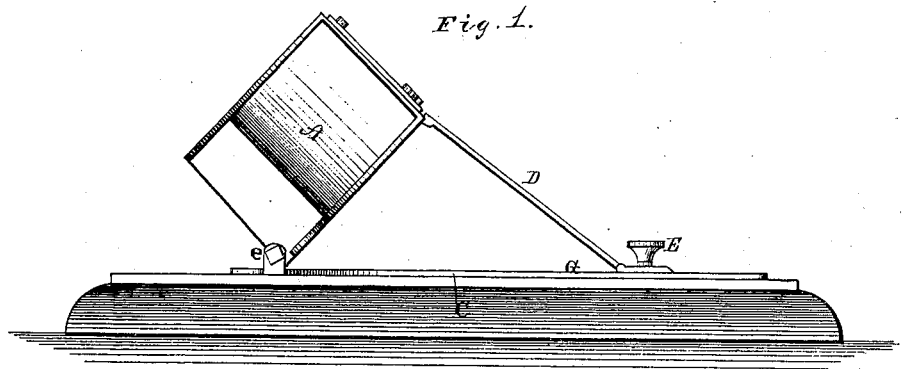
Figure 2:
Figure 3:
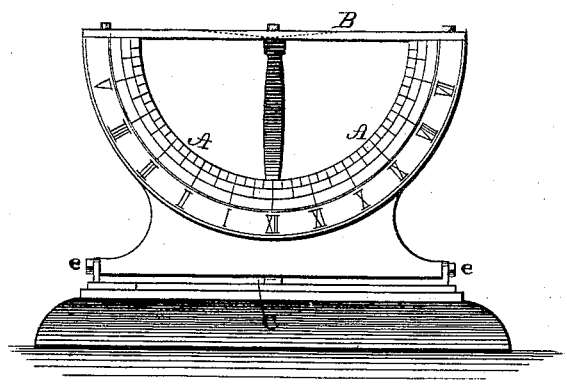
Figure 4:
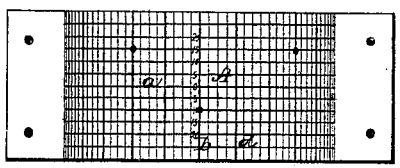
Figure 5:
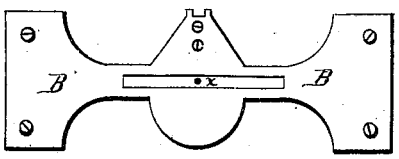

M. WHEELER.
SOLAR CHRONOMETER.

No. 170,423.  Patented Nov. 23, 1875.

WITNESSES.
J. W. McGarners
Jno. H. Inurn

INVENTOR.
M. Wheeler
per
F. A. Lehmann,
Atty

UNITED STATES PATENT OFFICE.

MARSHAL WHEELER, OF BIG RAPIDS, MICHIGAN.

IMPROVEMENT IN SOLAR CHRONOMETERS.

Specification forming part of Letters Patent No. 170,423, dated November 23, 1875; application filed October 25, 1875.

*To all whom it may concern:*

Be it known that I, MARSHAL WHEELER, of Big Rapids, in the county of Mecosta and State of Michigan, have invented certain new and useful Improvements in Solar Chronometer; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of an instrument which I call a "solar chronometer," having for its object to ascertain time and latitude by the sun, as will be hereinafter more fully set forth.

The annexed drawings, to which reference is made, fully illustrate my invention.

In the drawing, A is a semicircular concave plate representing a section of the earth (if the same were a hollow sperical shell) cut on parallel lines on each side of the equator a distance equal to the sun's apparent maximum declination, the same being 23° 27' 24". The ends of the semicircle A are connected by a plate, B, representing the earth's equatorial diameter, and in the center of this plate is a hole, $x$, for the sun to shine through. An image of the sun will then be cast between the hours of, say, 7 a. m. and 5 p. m., down upon the inner surface of said semicircle. The inner or concave surface of the semicircle A is laid off with declination-lines $a$ one degree apart, or nearer, if desirable, to the total amount of 46° 54' 48". The middle line of these graduations would, of course, occupy the position of and represent the earth's equator, and there would be 23° 27' 24" each side of it, equaling the maximum declination of the sun north and south during the year. At 90°, or the midpoint of the semicircle A, is drawn a line, $b$, across said circle at right angles with the equatorial and declination lines $a$. This line $b$ will be the principal meridian or 12-o'clock line. Parallel thereto, and on both sides, are laid off hour-lines $d$, fifteen degrees apart, minus the amount necessary to allow for the refraction of the sun's rays in passing through the earth's atmosphere.

If smaller subdivisions than hours are desirable, they may be introduced, conforming to the requisite proportionate refraction.

Having to use this instrument upon the round surface of the earth, it is necessary to arrange it that its circle may be set parallel to the equator in any latitude. To accomplish this in a convenient manner I use a bed-plate, C (or, as it may be called, a horizon-plate,) at each end of which is an upright ear, $e$, through which points are fastened, and upon these points the circle A rests and turns. The circle A is maintained in any desired position by means of a hinged connecting-rod, D, one end of which is attached to the solar bridge or plate, B, of the circle, and the other end to a clamp, E, sliding in a beveled slotted groove on a latitude-bar, G, which forms part of the horizon-plate C.

The latitude-bar G may be graduated to degrees and parts of a degree, and read to finer subdivisions by a vernier graduated upon the clamp E.

To use this chronometer, first set it to the latitude of the place where time is to be taken. This is done at noon by leveling the horizon-plate by means of a round level bubble attached to the center of the plate, or by an independent level, and then inclining the circle A so as to bring the sun's image upon the 12-o'clock or meridian line at that point where the declination-line for the given day and hour intersects the same. Then clamp fast, and the latitude of the place can be seen on the bar G. At that place solar time may be ascertained between the usual hours—say, from 7 a. m. to 5 p. m.—at any time by setting the clamp at the ascertained latitude, and bringing the sun's image upon the given declination for the day and hour, and, by using the proper equation, the same may be reduced to clock-time.

Another form of construction, involving the same principle, is simply to place a movable plate containing a meridian and short declination lines upon the inner edge of an hour-circle, with a pointer to read off time to any subdivision.

Having thus fully described my invention, what I claim as new, and desire to secure by Letters Patent, is—

1. The semicircle A, pivoted at *e*, and made adjustable by means of the sliding clamp E, substantially as shown and described.

2. The combination of the bed-plate C, adjustable semicircle A, with solar plate B, connecting-rod D, clamp E, and latitude-bar G, all substantially as and for the purposes herein set forth.

In testimony that I claim the foregoing I have hereunto set my hand and seal this 16th day of October, 1875.

MARSHAL WHEELER. [L. S.]

Witnesses:
MELVIN HALE JENNER,
WILLIAM R. LAWYER.